(No Model.)
P. E. DENISE & J. W. BENDER.
VEHICLE SPRING.
No. 306,906. Patented Oct. 21, 1884.
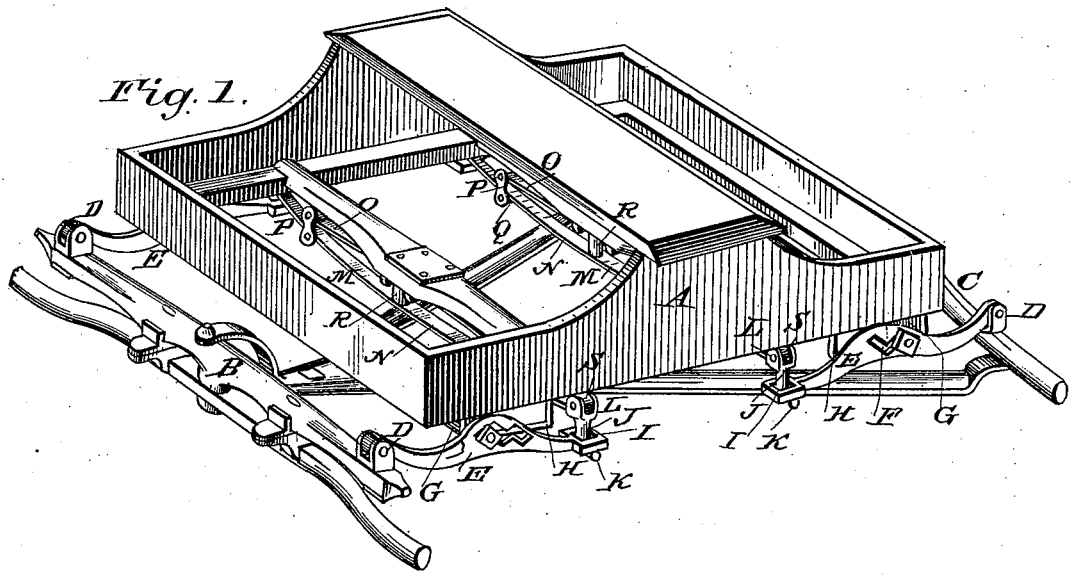
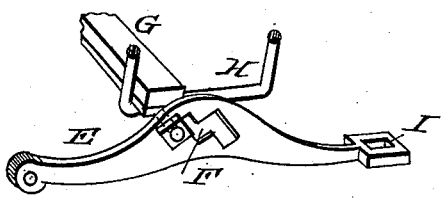
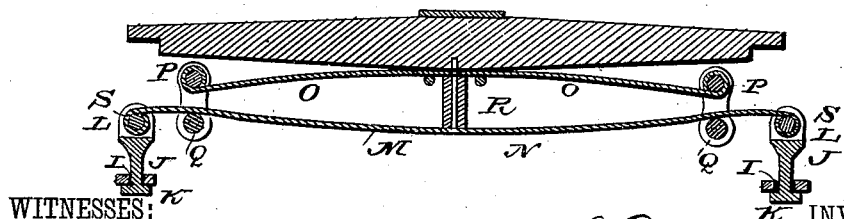
WITNESSES:
Fred. G. Dietrich
Wm. Fecher
INVENTORS:
P. E. Denise, & J. W. Bender
by Louis Bagger & Co.
ATTORNEYS.

UNITED STATES PATENT OFFICE.

PETER E. DENISE AND JOHN WESLEY BENDER, OF GREENVILLE, OHIO.

VEHICLE-SPRING.

SPECIFICATION forming part of Letters Patent No. 306,906, dated October 21, 1884.

Application filed June 14, 1884. (No model.)

*To all whom it may concern:*

Be it known that we, PETER E. DENISE and JOHN W. BENDER, citizens of the United States, and residents of Greenville, in the county of Darke and State of Ohio, have invented certain new and useful Improvements in Vehicle-Springs; and we do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of a vehicle provided with our improved adjustable spring attachment, seen slightly from below. Fig. 2 is a similar view, on an enlarged scale, of one of the adjustable slotted levers; and Fig. 3 is a view of one of the springs.

Similar letters of reference indicate corresponding parts in all the figures.

Our invention has relation to springs for vehicles; and it consists in the improved construction and combination of parts of a spring, and of an adjustable attachment for the springs, by means of which the pressure brought to bear upon the springs may be adjusted according to the weight of the load upon the vehicle, as hereinafter more fully described and claimed.

In the accompanying drawings, the letter A indicates the body of the vehicle, B indicates the forward bolster, and C is the rear axle, all of which parts may be of any desired construction, and connected in any desirable manner, and the bolster and the rear axle are provided with upright perforated lips D near their ends, the bolster having two and the axle having two pairs of lips, between which pairs of lips the ends of the slotted levers E are pivoted upon bolts passing through the perforations in the lips. These levers have at or near their middles a zigzag-shaped slot, F, and are preferably curved slightly upward at their middles, and two transverse bars, G, slide with their ends in ways or long staples H upon the under side of the vehicle-body—one at each end of the said body—and project with their reduced ends into the zigzag slots, sliding in the same. The inner ends of the slotted levers have longitudinal slots I, through which the lower ends of bolts J project, the said bolts being provided upon their lower ends with nuts or enlargements K, bearing against the under side of the slotted ends, and the upper ends of these bolts are formed into a pair of perforated lips, L, between which the ends of the transverse springs M, which are secured to the under side of the body, are movably secured upon bolts. The springs consist of two pieces, N and O, the upper piece, O, of which is secured at its middle to the vehicle-body, and provided at its ends with shackles P, provided at their lower ends with rollers Q, through which shackles the lower spring, N, passes, bearing against the rollers, which said spring is secured at its middle upon a prop or downwardly-projecting post, R, secured to the vehicle-body and to the middle of the upper spring, and the ends of which spring form eyes S, fitting movably upon the bolts passing through the lips L of the bolts secured in the slotted ends of the levers. It will now be seen that, the fulcrum for the levers being in the clips or perforated lips upon the bolster or the rear axle, and the weight of the load upon the vehicle falling upon the transverse bars and through their reduced ends upon the slots in the levers, the strain upon the springs may be increased by moving the transverse bars closer to the inner ends of the levers and to the springs—that is, moving the burden closer to the power—while by moving the transverse bars toward the ends of the vehicle-body, and consequently farther from the ends of the levers and from the springs, the burden is moved farther from the power, and consequently the strain upon the springs is decreased. Thus the transverse bars are slid farther out when the load upon the body is increased, while they are slid inward when the load upon the body is decreased, the strain upon the springs remaining nearly the same with a heavy or light load. It follows that the slots may be straight when suitable means for securing the ends of the transverse bars are provided; and it also follows that by the slots being zigzag-shaped, and having preferably their ends inclined downward, and having a depression in the zigzag at the middle of the slot, the reduced ends of the transverse bars will remain in their adjusted positions without any other means for securing them. It also follows that, although we prefer to use the form of springs herein shown and described, any other form of springs secured transversely under the body of the vehicle will be as useful with the levers, and that the springs shown and described may be used with any form of attachment.

Having thus described our invention, we claim and desire to secure by Letters Patent of the United States—

1. The combination, in a vehicle-spring, of the upper short spring adapted to be secured to the vehicle, and provided with shackles having rollers at its ends, the prop or post secured to the middle of the short spring, and the long lower spring secured at its middle to the lower end of the prop or post passing through the shackles at the ends of the short spring, and formed with eyes at its ends, as and for the purpose shown and set forth.

2. The combination of the running-gear of a vehicle, levers pivoted at their outer ends to the running-gear, and having slots at their middles, transverse bars sliding under the body of the vehicle, and with their ends in the slots of the levers, having means for adjusting them in the same, and springs secured transversely under the body of the vehicle, and at their ends to the ends of the levers, as and for the purpose shown and set forth.

In testimony that we claim the foregoing as our own we have hereunto affixed our signatures in presence of two witnesses.

PETER E. DENISE.
JOHN WESLEY BENDER.

Witnesses:
DANIEL TRIMBLY BLACK,
FLAVIOUS FITZGERALD.